(12) United States Patent
Ellington et al.

(10) Patent No.: US 8,584,119 B2
(45) Date of Patent: Nov. 12, 2013

(54) MULTI-SCENERIO SOFTWARE DEPLOYMENT

(75) Inventors: Bryan M. Ellington, Cary, NC (US); Colleen D. Lhota, Cary, NC (US); Joseph Loewengruber, Raleigh, NC (US); Perry L. Statham, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1433 days.

(21) Appl. No.: 12/145,243

(22) Filed: Jun. 24, 2008

(65) Prior Publication Data

US 2009/0320019 A1    Dec. 24, 2009

(51) Int. Cl.
  *G06F 9/445*    (2006.01)
(52) U.S. Cl.
  USPC .......................................... 717/177; 717/174
(58) Field of Classification Search
  USPC .......................................................... 717/177
  See application file for complete search history.

(56) References Cited

U.S. PATENT DOCUMENTS

| | | | |
|---|---|---|---|
| 6,101,481 A * | 8/2000 | Miller | 705/7.13 |
| 6,370,686 B1 * | 4/2002 | Delo et al. | 717/174 |
| 6,453,469 B1 * | 9/2002 | Jystad | 717/174 |
| 7,346,435 B2 * | 3/2008 | Amendola et al. | 701/1 |
| 7,793,284 B2 * | 9/2010 | Mason et al. | 717/174 |
| 2005/0114829 A1 * | 5/2005 | Robin et al. | 717/101 |
| 2006/0218548 A1 * | 9/2006 | Mason et al. | 717/174 |
| 2007/0266006 A1 * | 11/2007 | Buss | 707/3 |

* cited by examiner

*Primary Examiner* — Li B Zhen
*Assistant Examiner* — Joanne Macasiano
(74) *Attorney, Agent, or Firm* — Steven L. Nichols; Van Colt, Bagley, Cornwell & McCarthy P.C.

(57) ABSTRACT

A method for multi-scenario software deployment includes creating a software deployment plan that includes at least one task granulated into independently executable sub-tasks; and saving the software deployment plan on a computer readable medium. A computer program product for multi-scenario software deployment includes computer usable program code configured as a software deployment program which runs on a controlling computing device; the software deployment program being configured to: query a user for deployment parameters corresponding to software to be deployed to a target computing device(s); and create a plan for deploying software to a target computing device(s) which can be performed automatically and includes tasks that can be independently performed by separate people. The tasks deploying the software to the target computing device(s) are then performed according to the deployment parameters.

20 Claims, 9 Drawing Sheets

MULTI-SCENERIO SOFTWARE DEPLOYMENT

BACKGROUND OF THE INVENTION

The present specification relates to the field of installing and customizing software for computing devices.

In enterprise computing infrastructures, it is common for multiple computing devices to be interconnected through a network. Many types of software packages exist to provide support for enterprise operations. In many cases, the various features of a software package are selectively deployed to one or more computing devices throughout the computing infrastructure. The process of installing and configuring features from such a software package on one or more computing devices is known as deployment.

Deploying software in an enterprise environment can be difficult using conventional techniques. Software is often deployed for demonstration or proof-of-concept scenarios where only a single person is involved and all the software is deployed to a single computing device. In production environments, many people may be required to carry out the software deployment across the enterprise infrastructure. In the past, optimizing deployment for one scenario would often de-optimize the deployment for other scenarios. Highly automated deployments that work well for demonstration or proof-of-concept scenarios do not work well when the deployment needs to be divided among a number of people, and vice versa.

BRIEF SUMMARY OF THE INVENTION

A method for multi-scenario software deployment includes creating a software deployment plan that includes at least one task granulated into independently executable sub-tasks; saving the software deployment plan on a computer readable medium; and performing the sub-tasks in the persistent software deployment plan.

A computer program product for multi-scenario software deployment includes computer usable program code configured as a software deployment program which runs on a controlling computing device. The software deployment program is configured to query a user for deployment parameters corresponding to software to be deployed to a target computing device(s) and create a plan for deploying software to a target computing device(s) which can be performed automatically and includes tasks that can be independently performed by separate people. The tasks for deploying the software to the target computing device(s) are then performed according to the deployment parameters.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION OF THE INVENTION

As described above, different features of a software package are commonly deployed to networked computing devices, such as servers. This software may include server management software, security software, other middleware, and the like. However, considering the different scenarios in which the software may be deployed, it can be difficult to produce a single approach to software deployment that has the flexibility to meet the needs of consumers.

For example, in a proof-of-concept scenario, software may be deployed for demonstration or prototype scenarios by a single person, with all the software being deployed to a single computing device. In contrast, a production scenario may require that multiple domain experts carry out individual pieces of the deployment of the same software to multiple computing devices.

In the past, optimizing the deployment process for one scenario has typically complicated or been detrimental to the deployment process for other scenarios. For example, highly automated deployment processes have worked well in simplifying the deployment of software in some proof-of-concept scenarios, but unfortunately have complicated the process of deploying the same software for certain production scenarios in which various tasks in the deployment process must be carried out by different people. Further, most software deployment schemes lack the ability to leverage previously installed software elements.

For example, after a successful proof-of-concept installation, an organization desires to proceed with a full production deployment onto its Information Technology (IT) infrastructure. The production deployment is typically unable to utilize the software and elements that are pre-existing within the IT infrastructure. Consequently, the production deployment must reinstall and reconfigure each element of the software package. For example, during the proof-of-concept deployment, a new database may be installed with a variety of dummy user names and passwords. During the production deployment, it is desirable to leverage an existing functional database that contains all the organization's user names and passwords, rather than being forced to install and populate a new database.

Therefore, in some cases, it may be desirable to provide a deployment solution for software that simplifies the software deployment process for multiple scenarios. It may also be desirable to provide a more automated software deployment process that accommodates the division of tasks to different people. In many cases, it could be desirable to organize each task within the deployment solution according to the various information technology (IT) roles within an organization. This ensures that each task does not require more than one IT administrator for successful completion. Additionally, installation tasks could be separated from configuration tasks. This enables previously installed instances of software to be leveraged, thereby allowing the new software package to be more fully integrated into the customer's existing IT infrastructure. Additionally, by leveraging previously installed instances of software, a significant amount of time and resources can be saved during the software deployment by skipping the unneeded install tasks.

The deployment plan should be flexibly constructed such that a single user can execute the entire plan or the plan can be decomposed so that role administrators can execute sub-sets of the tasks in the plan. Ideally, the deployment plan should be in human readable form, with clearly defined segments and ordering. Creating a written and understandable deployment plan allows various tasks to be reviewed and modified by various people with the appropriate skill and authority. By way of example and not limitation, these people may be IT administrators and/or subject matter experts.

To accomplish these and other goals, the present specification discloses methods and related systems for software deployment in which a user is guided to create an automated deployment plan for each target computing device to which a feature of the software is to be deployed. Each plan may include a list of deployment tasks that may be immediately executed when the deployment plan is created or alternatively distributed to one or more people with responsibilities to administer portions of the IT infrastructure.

As used in the present specification and in the appended claims, the term "deploy" refers to the installation and configuration of software on one or more target computing devices. In the specification and appended claims the terms "production environment," "production scenario," and "production deployment" refer to enterprise organizations with multiple computing elements and/or multiple individuals with information technology administrative roles. Thus, a "production deployment" of a software package refers to the installation and configuration of software on multiple computing elements and/or by multiple individuals. The term "installation" refers to copying a program or structure onto a target system and performing other necessary operations such as creating a file structure or making registry entries. The term "configuration" refers to operations that are typically performed following the installation of a software package and may include making configuration file entries or setting environmental variables. In the specification and appended claims, the term "persistent deployment plan" refers to a deployment plan that is saved to a file and retrievable for execution at a later time.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language, scripting languages, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
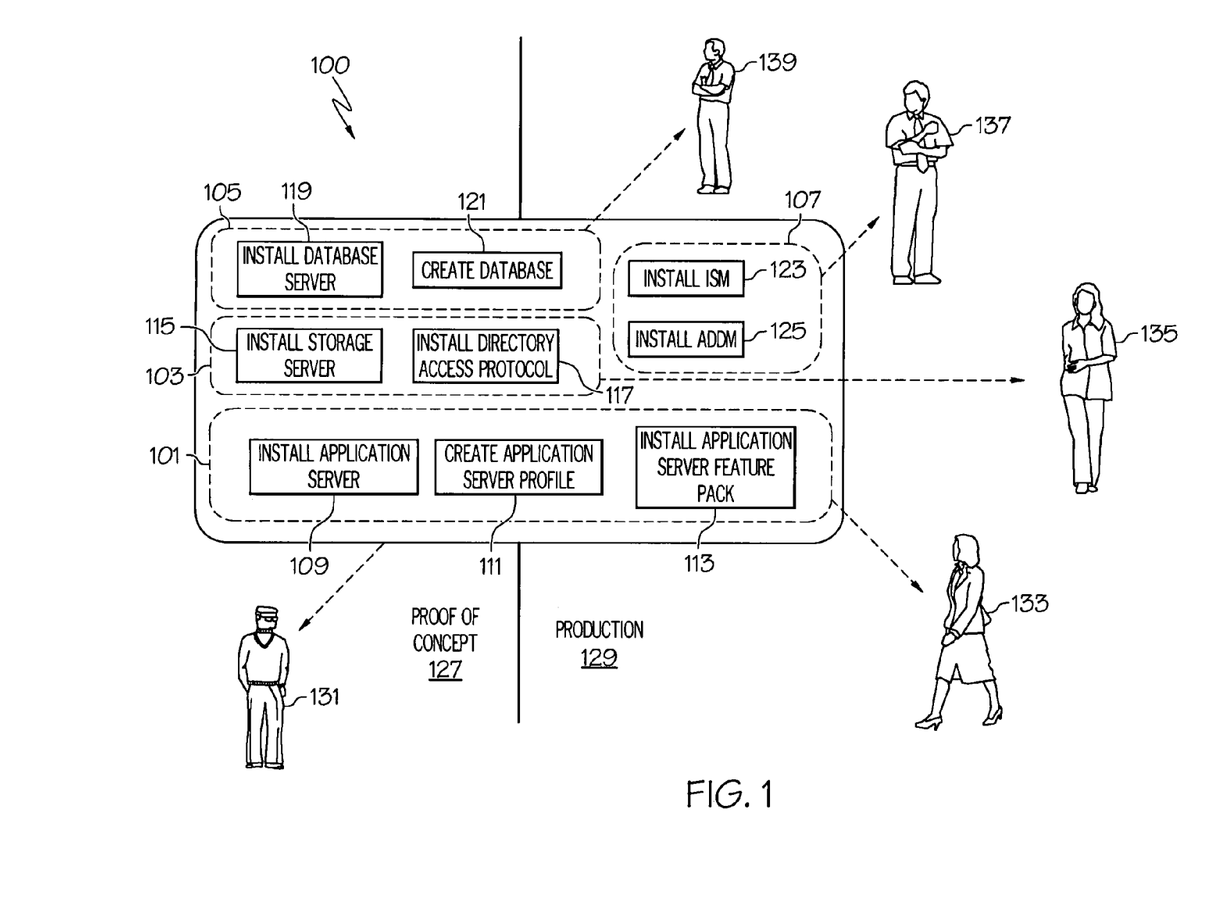
FIG. 1 is a diagram of illustrative installation tasks in deployment of a software package, according to one embodiment of principles described herein.

With reference now to FIG. 1, a diagram of an illustrative process of deploying software (100) is shown. In the present example, application server software (101), data storage server software (103), database server software (105), and systems management software (107) are all included in the software package to be deployed.

The application server software (101) may be configured to deliver applications to client computing devices through the Internet or another network connection. To deploy the application server software (101), a number of tasks (109, 111, 113) may be performed. One of these tasks (109, 111, 113) may include installing (109) the application server software itself. This may be done by decompressing and copying software images from a source location to a specified location(s) accessible by the target computing device. Installing (109) the application server software may also include updating system settings in the target computing device, such as registry values.

Another task to be performed in deploying the application server software (101) may be that of creating (111) an application server profile for the software. By creating (111) the application server profile, the application server software (101) may be configured according to the needs and/or preferences of the user or entity managing the software. An additional task that may be performed in deploying the application server software (101) may be that of installing (113) an application server feature pack.

The data storage server software (103) may be configured to store and organize data and provide the data to client computing devices over a network connection. To deploy the data storage server software (103) to a target computing device, the tasks of installing (115) the storage server software (103) to the target computing device and installing (117) a directory access protocol to the target computing device may be performed.

The database server software (105) may be configured to retrieve stored data from a database corresponding to a query from a client computing device over a network connection and provide the stored data to the client computing device. To deploy the database server software (105) to a target computing device, the tasks of installing (119) the database server software to the target machine and creating (121) at least one instance of the database can be performed.

The systems management software (107) may be configured to perform the overall management of applications, dataflow, and the security of information in an enterprise environment. To deploy the systems management software (107) to a target device, the tasks of installing (123) information security management software and installing (125) application discovery and dependency management (ADDM) software to the target machine may be performed.

In the present example, the personnel involved in the deployment of the software (100) are shown for two different scenarios of deployment—namely a proof-of-concept scenario (127) and a production scenario (129). In the proof-of-concept scenario (127), a single member (131) of a sales or evaluation team may deploy all of the software (100) onto a single target computing device for testing or demonstration purposes.

By contrast, in the production scenario (129), different aspects of the middleware software deployment may be assigned to and executed by various individuals (133, 135, 137, 139). According to certain embodiments of the production scenario (129), different portions of the software (100) may be deployed onto different target computing devices. As described above, the individuals (133, 135, 137, 139) may be subject matter experts, authorized operators and/or administrators of one or more of the target computing devices to which the software is to be deployed. According to one exemplary embodiment, the deployment sub-tasks may be divided according to the various roles of the individuals (133, 135, 137, 139). For example, the roles of the individuals (133, 135, 137, 139) may be organized around various IT roles such as security, networking, databases, or operating systems. To fulfill his or her IT role, the individual (133, 135, 137, 139) may have administrative rights and responsibilities over multiple machines within an organization.

For example, in the present example the deployment tasks (109, 111, 113) associated with the application server software (101) may be assigned to and independently executed by an application server expert (133), while the deployment tasks (115, 117) associated with the storage server software (103) may be independently executed by a data storage expert (135). Likewise, the deployment tasks (119, 121) associated with the database server software (105) may be independently executed by a database administrator (139), and the deployment tasks (123, 125) associated with the systems management software (107) may be independently executed by a systems management administrator (137). Each of these roles may require that the various individuals (133, 135, 137, 139) access multiple machines and software programs.

Figure 2:
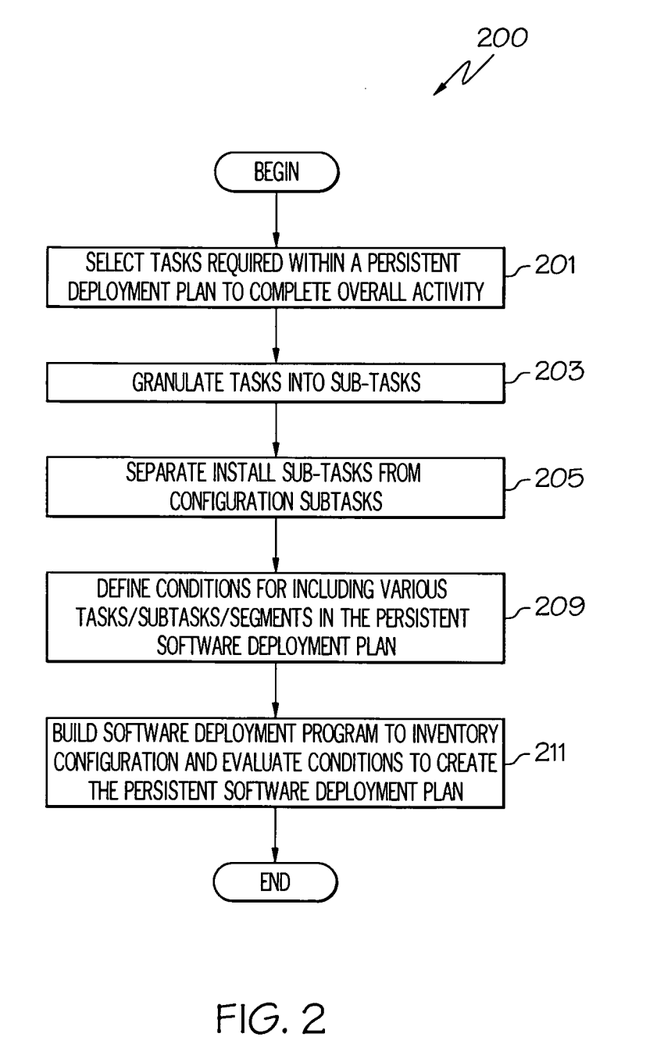
FIG. 2 is a flowchart showing an illustrative method for a developer to prepare a multi-scenario software deployment application, according to one embodiment of principles described herein.

FIG. 2 is a flowchart showing one illustrative method for a developer to create a multi-scenario software deployment program. In a first step, the software developer selects the spectrum of tasks that are required to complete the overall deployment activity (step 201). Next, the software developer granulates the tasks into sub-tasks (step 203). According to one exemplary embodiment, the scope of each sub-task would be limited such that a single individual could accomplish any one of the sub-tasks. Additionally, the sub-tasks may be granulated such that no sub-task performs both a configuration and an installation operation. Other considerations may be used in the granulation of tasks, such as limiting a sub-task to an individual machine, application, or logical operation. The process of granularization produces sub-tasks that have a clearly defined purpose and boundaries. By way of example and not limitation, sub-tasks may include checking the characteristics of the target machine, such as the operating system type, the release number a software installation, or the amount of memory present on a target machine.

According to one illustrative embodiment, installation sub-tasks are then separated from the configuration sub-tasks (step 205). The separation of the installation sub-tasks from the configuration subtasks allows the deployment process to check for previously installed instances of the software. If there is a previously installed instance of the software or a needed component, at least some of the installation sub-task can possibly be skipped. As discussed above, leveraging previously installed and configured components allows the new software package to be more fully integrated into the customer's existing IT infrastructure and may save time/resources during the software deployment.

According to one exemplary embodiment, each sub-task is an independently executable computer program that is both machine-readable and human-readable. The term human-readable refers to a representation of information that can be naturally read and understood by humans. By way of example and not limitation, some extensible markup language scripts are human-readable.

The conditions for including various tasks and sub-tasks in the deployment plan are then defined (step 209). By way of example and not limitation, these conditions may include which operating system is installed on the target machine, which portions of the software package are being deployed, or other similar conditions. The software developer then builds a software deployment program to inventory the configuration and evaluate the relevant conditions (step 211). For example, a software deployment program may first query the target machine or machines to determine which operating system is currently being used, the available resources of the target machine, or other information. Alternatively, the software deployment program may request this information from a configuration management database or other source. The software deployment program also guides the user through a series of options or screens in which the user inputs information required to evaluate the conditions for including various tasks. By way of example and not limitation, the software deployment program could ask the user to select the portions of the software which the user desires to deploy.

Figure 3:
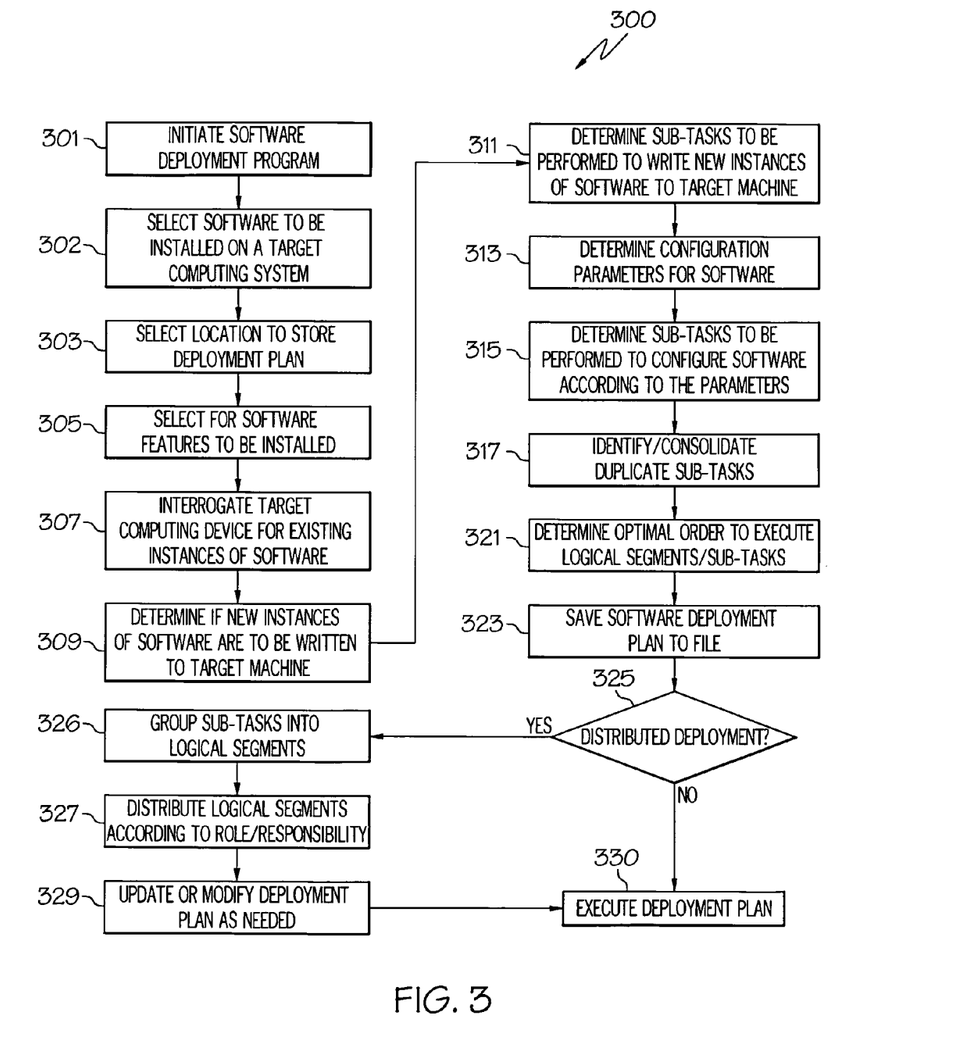
FIG. 3 is a flowchart showing an illustrative method of deploying a distributable software package using a multi-scenario software deployment application, according to one embodiment of principles described herein.

Referring now to FIG. 3, an illustrative method (300) is shown of deploying software to one or more target computing devices using a software deployment program. Following the creation of a software deployment program by a developer as described in FIG. 2, the software deployment program is typically bundled with a software package and distributed to various customers. The customers then use the software deployment program to create a customized software deployment plan for their organization. The method (300) may be used in a scenario in which a single user is deploying software to a single machine for marketing, proof-of-concept, or prototyping. Additionally or alternatively, the method (300) may be used to decompose a deployment plan into separate logical segments that are then executed by one or more individuals.

The method (300) may include initiating the software deployment program (step 301) and selecting (step 302) an article of software to be installed on a target computing system which may include one or more servers. For example, the article of software may include system management software with a plurality of installable features. According to one exemplary embodiment, a customized software deployment program is included within the software package.

The software deployment program is started and the user may then be queried (step 303) for a location to store the deployment plan. The location may be a directory or folder on a hard disk drive or any other type of computer readable media. The user may also be queried (step 305) for deployment parameters, including software feature selections. These software features may include, but are not limited to, application server management software, database server management software, storage server management software, security software, and the like.

Next, the target computing system may be interrogated (step 307) to discover existing instances or portions of instances of the software or its components to be deployed to the target computing device. As discussed above, previously installed instances of the software or portions of the software stored by the target computing device may be leveraged by the software deployment process, thereby facilitating the integration of the software package into the IT infrastructure.

From this interrogation (step 307), it may be determined (step 309) if new instances of the software or portions of the software are to be written to the target machine. This may be at least partially dependent on selected features of the software that are to be deployed to the target machine, as specified by a user and whether any of portions of the software are already resident on the target machine. Next, it is determined (step 311) which tasks need to be performed to write any needed new instances of the software or its components to the target machine. These tasks may include, but are not limited to, retrieving the software source images to be copied from a source location, obtaining and providing security credentials to the target computing device, identifying a destination location in the target computer, and copying the source images.

The method (300) may further include determining (step 313) the configuration parameters for the software to be deployed to the target device. The configuration parameters for the software may be provided by the user, retrieved from a file, or calculated using discovered or input data. The configuration parameters used for the software deployment may be at least partially determined by the particular features of the software that are to be deployed to the target device. Other configuration parameters may be required for all deployments of the software or be specific to particular target computing devices. The configuration parameters may include, but are in no way limited to, installation locations, locations of root files and software images, usernames, passwords, instance names, ports, administrator groups, user groups, country and language parameters, suffixes, hostnames, profile names, cell names, node names, and the like. After gathering the configuration parameters, an additional determination of sub-tasks to be performed in order to configure the software according to these parameters may be made (step 315).

In certain embodiments, the tasks to be performed for writing new instances of the software to the target machine and configuring the deployed software according to the specified parameters may be determined algorithmically by extraction from a pool of all possible deployment tasks according to the software features to be installed, configuration parameters, and/or any other parameter that may suit a particular application of the principles herein.

The method (300) may additionally include identifying and consolidating (step 317) duplicate sub-tasks. For example, in some embodiments the same sub-task may be performed in the process of writing new instances of software to the target machine and in configuring the deployed software. Through the processes of identifying and consolidating (step (317) duplicates, the sub-task may be performed only once, thus conserving system resources. Furthermore, the method (300) may include determining (step 321) an optimal order in which to execute the logical segment/sub-tasks and saving (step 323) this customized deployment plan to a file. According to one exemplary embodiment, the customized deployment plan contains ordering dependency information that describes one or more allowable sequences for executing the various sub-tasks contained within the deployment plan. Like the other parts of the deployment plan, the ordering dependencies may be human readable and modifiable without recompilation.

It is then determined if there is to be a distributed deployment of the software deployment plan or if the software deployment plan will be executed without division (determination 325). If the deployment plan is to be executed without division, the deployment plan can be executed (step 330) by a single individual. If the software deployment plan is to be distributed among several people having skill and authority to execute portions of the plan, the sub-tasks can be grouped into logical segments (step 326). These logical segments may include grouping sub-tasks that are common to a specific IT role, machine, application, or similar criteria. Granulating the tasks into sub-tasks and then regrouping these tasks into various logical segments allows for various deployment plans to be generated which are optimized for different deployment scenarios. In particular, this allows for the division of the deployment plan into logical segments that correspond to various IT roles within an organization.

These logical segments are then distributed among the several individuals according to their role or responsibility (step 327). The individuals can view the software deployment plan before it is executed. If necessary, they can update or modify the deployment plan to best suit the needs of their organization (step 329). The deployment plan is then executed (330).

As discussed above, the deployment plan is configured with the specific input parameters required to deploy the software to the target computing system. The saved deployment plan is specific to the target computing system and does not require any additional input parameters to execute. By saving the deployment plan in a human readable format, customers can view and understand the implications of the deployment plan for their system before it is executed. If necessary, the deployment plan can be retrieved and modified. After generating and saving the deployment plan, the customers can defer execution of the plan until a later date. Additionally, customers can repeatedly perform the same deployment by retrieving it from the saved location. If problems occur during the deployment, the deployment plan can be retrieved from its saved location and sent to a support person to assist in the debugging process.

Referring now to FIGS. 4-11, illustrative graphical user program windows for an illustrative software deployment program are shown. The illustrative windows may be displayed, for example, on a computer screen of a computing device running the software deployment program. The software deployment program may be configured to guide a user through the steps of creating a written and customized deployment plan described in FIG. 3 and the accompanying text.

Figure 4:
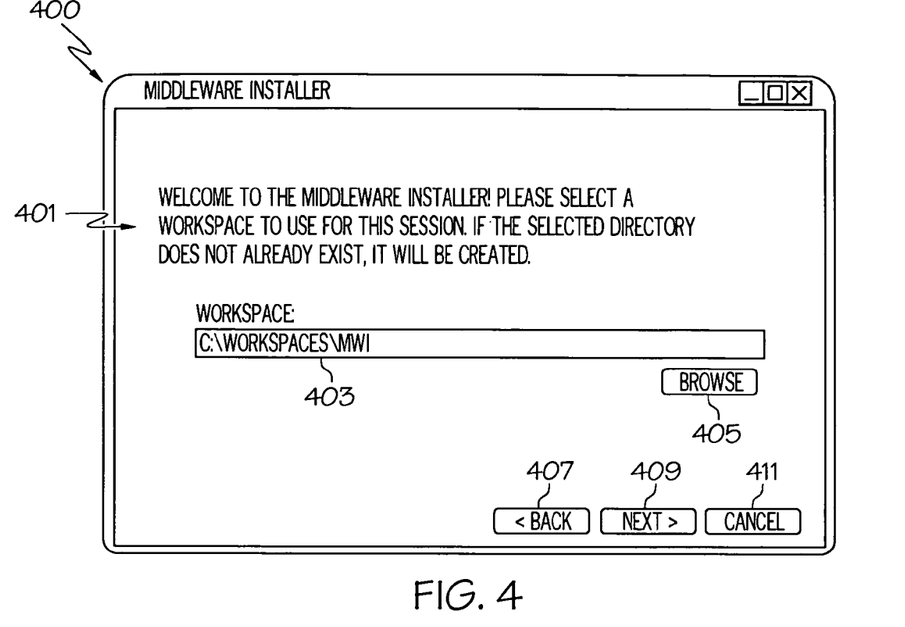
FIG. 4 is a diagram of an illustrative graphical user program window in a system for deploying software, according to one embodiment of principles described herein.

FIG. 4 shows an illustrative introductory window (400) welcoming the user and displaying a prompt (401) to provide a directory for the software deployment program to store the deployment plan to be created for the target computing device and/or any other files that the program creates. The user may enter the desired location into a text box (403) using a keyboard or other textual input device. Alternatively, the user may locate the desired location graphically by selecting a "browse" button (405) with a cursor. Navigational buttons (407, 409) may be used to navigate backwards or forward, respectively, through a succession of windows from the software deployment program. A "cancel" button (411) may be used to cancel operations of the software deployment program.

Figure 5:
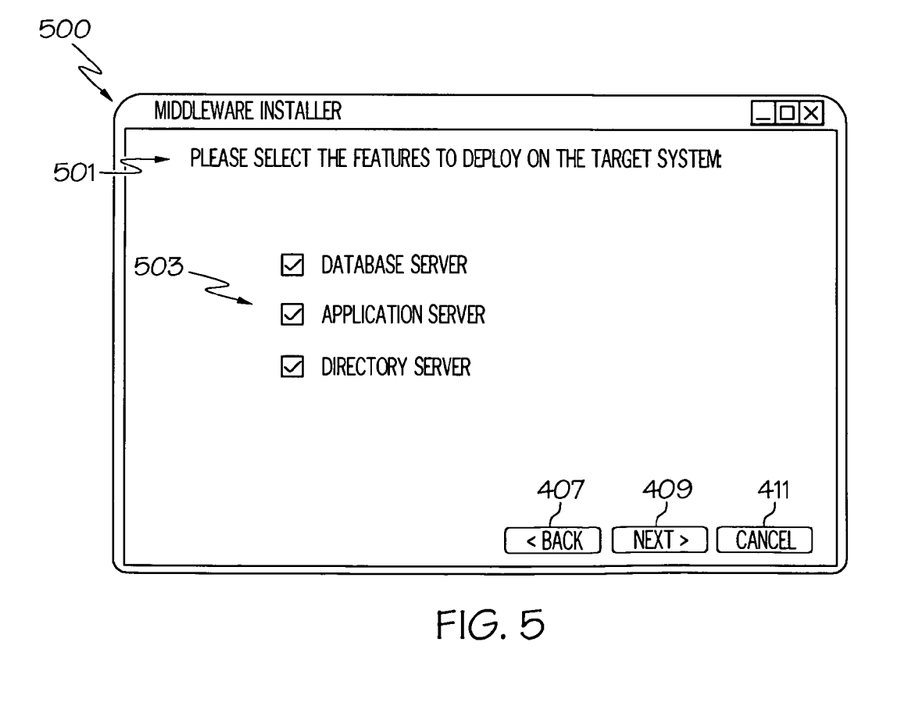
FIG. 5 is a diagram of an illustrative graphical user interface window in a system for deploying software, according to one embodiment of principles described herein.

FIG. 5 shows an illustrative subsequent window (500) in which the user is given a prompt (501) to select the features of the software to be deployed to the target device. In the present example, the user may select which of the features to deploy using check boxes (503).

Figure 6:
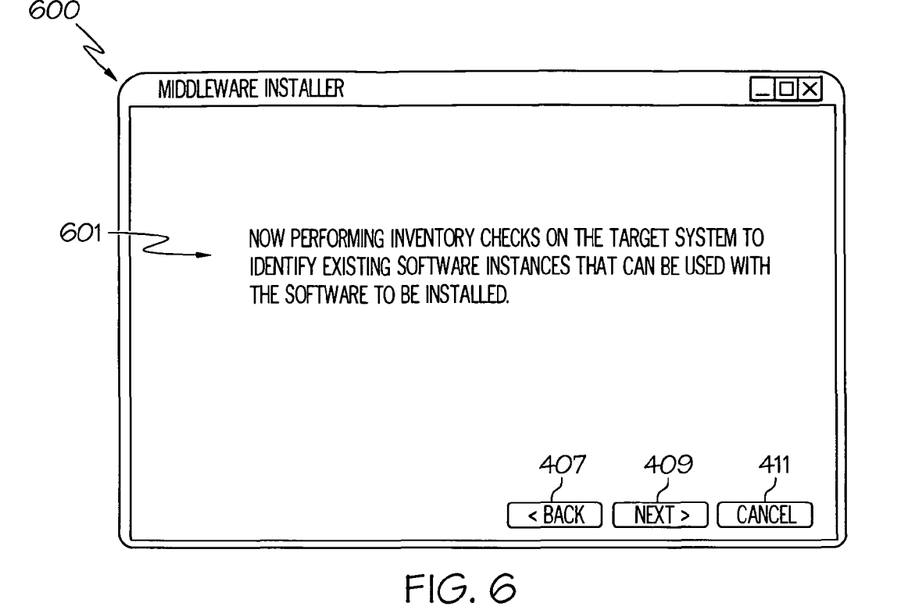
FIG. 6 is a diagram of an illustrative graphical user interface window in a system for deploying software, according to one embodiment of principles described herein.

FIG. 6 shows an illustrative subsequent window (600) providing a message (601) that informs the user that inventory checks are being performed on the target computing device to identify existing software instances, including any existing components or modules, that may be used to deploy the desired features of the software to the target device.

Figure 7:
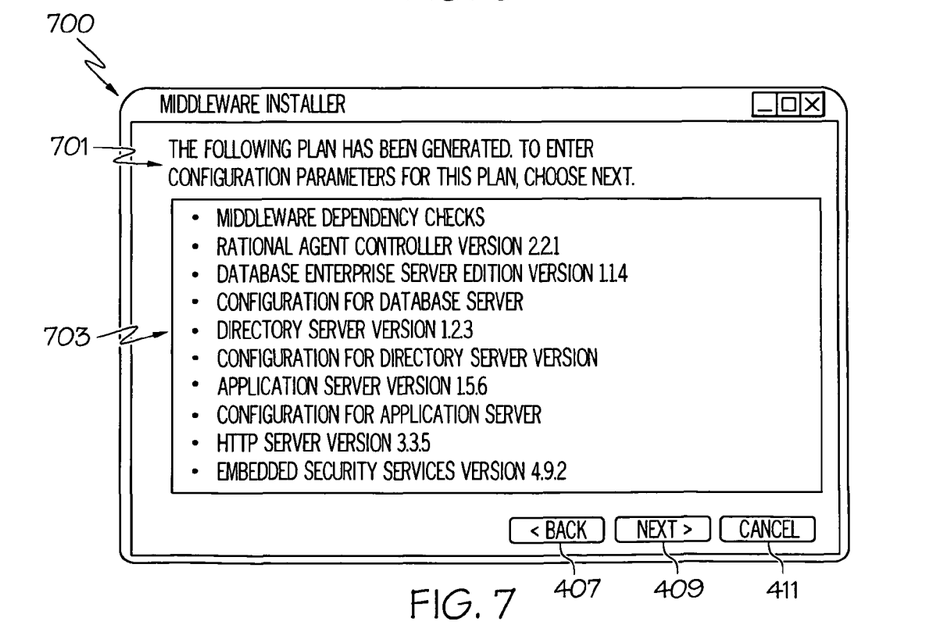
FIG. 7 is a diagram of an illustrative graphical user interface window in a system for deploying software, according to one embodiment of principles described herein.

FIG. 7 shows an illustrative subsequent window (700) providing a message (701) informing the user of a sequence of tasks (703) generated in a preliminary deployment plan for the target device and prompting the user to begin entering configuration parameters by clicking on a navigational button (709).

Figure 8:
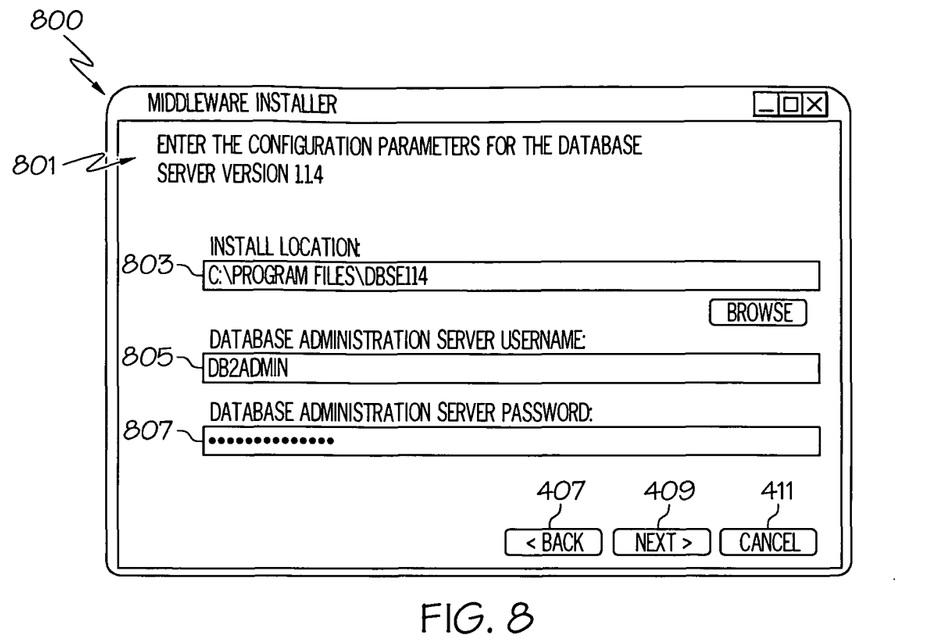
FIG. 8 is a diagram of an illustrative graphical user interface window in a system for deploying software, according to one embodiment of principles described herein.

FIG. 8 shows an illustrative subsequent window (800) displaying a prompt (801) for the user to enter in a set of configuration parameters (803, 805, 807) for a particular feature of the software to be deployed to the target computing device. While only one configuration parameter window (800) is shown in the present example for brevity, in certain embodiments, the user may be presented with a plurality of such windows prompting him or her to provide additional configuration parameters for the software to be deployed. The user may also be prompted for any number of other parameters that may suit a particular application. For example, the user may be prompted to provide the program with a location where compressed software installation source images are stored and a location to which the source images may be uncompressed for copy to the target computing device.

Figure 9:
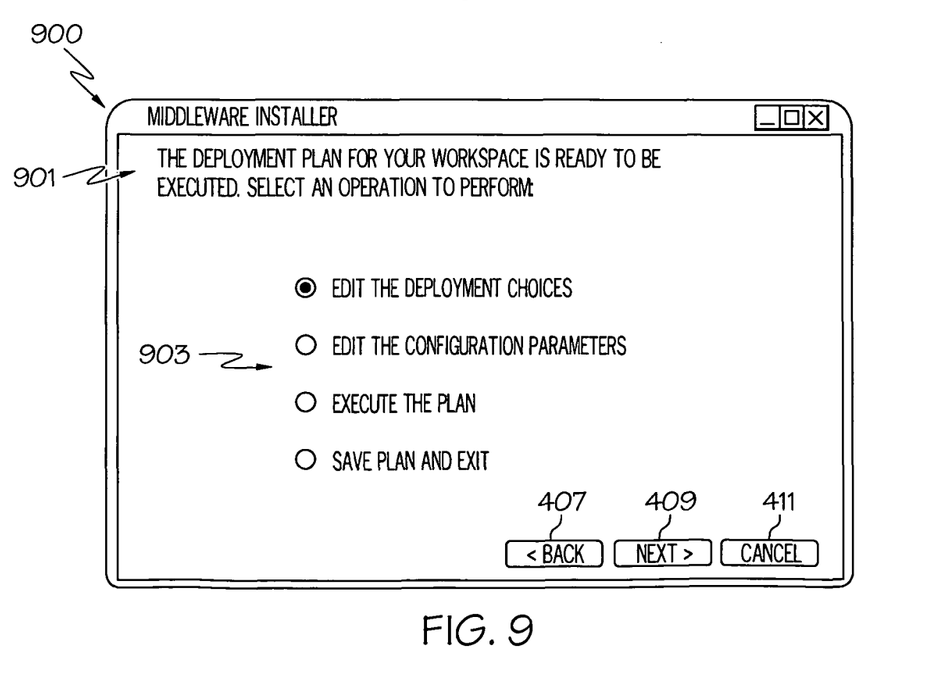
FIG. 9 is a diagram of an illustrative graphical user interface window in a system for deploying software, according to one embodiment of principles described herein.

FIG. 9 shows an illustrative subsequent window (900) displaying a message (901) informing the user that the deployment plan for the target computing device has been successfully created and is ready to be executed. The user may be prompted to select how to proceed from this point from a list of options (903), including the options of editing the deployment choices (i.e. selected features of the software to be deployed to the target computing device), editing the configuration parameters, executing the deployment plan immediately, and saving the deployment plan for later execution. When the deployment plan is saved for later execution, a number of files containing the deployment plan are written to the location designated by the user (see FIG. 4).

According to one exemplary embodiment, the deployment plan is saved in a first file folder which contains the entire deployment plan. The deployment plan may then be accessed, modified, and/or executed at a later time. Within the first file folder are various subfolders which contain the segments which make up the deployment plan. The subfolders may be organized in a variety of ways, including on a per machine basis or a role-by-role basis. Within each subfolder are various files which represent the steps to be taken to accomplish that particular segment of the overall deployment plan. Various scripts or build files may be included in the deployment plan for the automatic execution of various segments of the deployment plan. By way of example and not limitation, an ANT driven orchestration can be used to implement a segment of the deployment plan directed to an individual machine or group of machines. ANT is a platform independent, Java based software tool for automating software build and deployment processes. These script or build files may be executed through a middleware installer user program, directly through ANT, or using other compatible software tools.

In organizations where multiple IT administrators work cooperatively to support the IT infrastructure, the separate segments of the overall deployment plan may be distributed to various people for independent execution. In production situations, these people can access the desired sub-folder or sub-folders and execute the steps within the deployment plan that are tied to their role.

Figure 10:
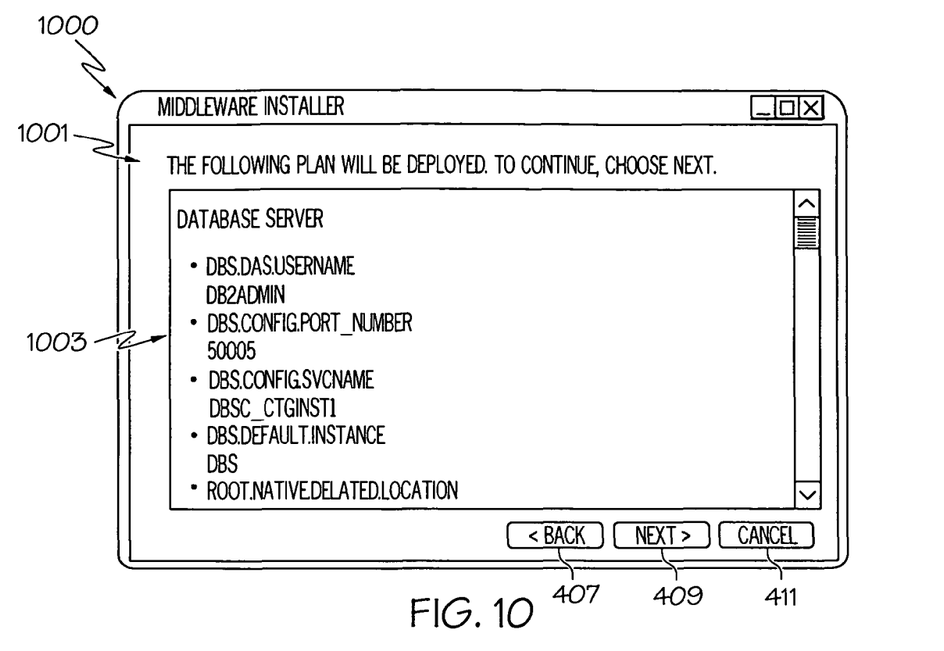
FIG. 10 is a diagram of an illustrative graphical user interface window in a system for deploying software, according to one embodiment of principles described herein.
Figure 11:
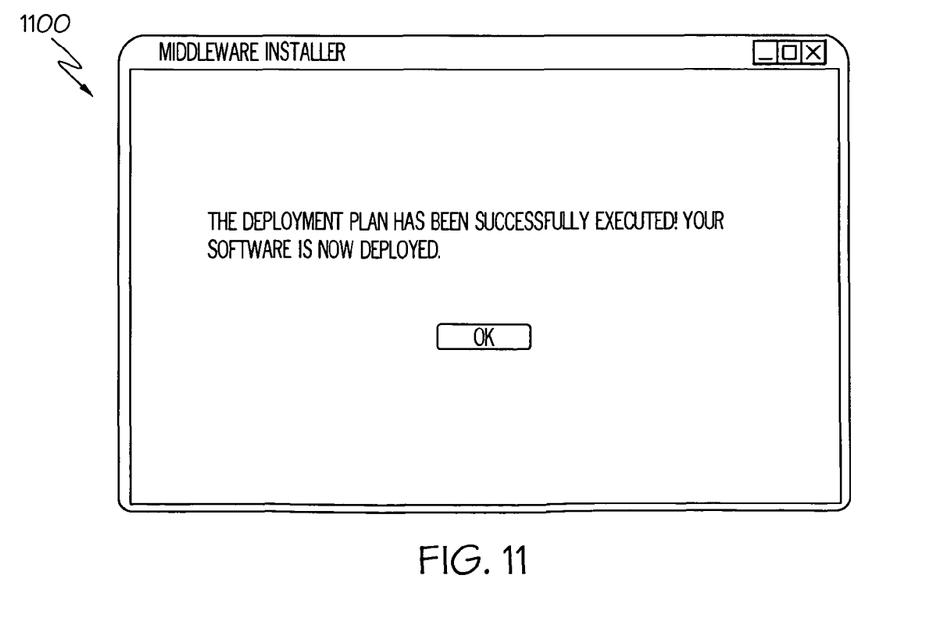
FIG. 11 is a diagram of an illustrative graphical user interface window in a system for deploying software, according to one embodiment of principles described herein.

FIG. 10 shows an illustrative subsequent window (1000) after the user has selected the option of executing the deployment plan immediately. The user is shown a message (1001) reminding him or her that the deployment plan is about to be executed in addition to a view of the complete deployment plan (1003) for review. FIG. 11 shows an illustrative subsequent window (1100) indicating to the user that the deployment plan has been successfully executed and that the selected features of the software have now been successfully deployed to the target computing device according to the desired parameters.

Figure 12:
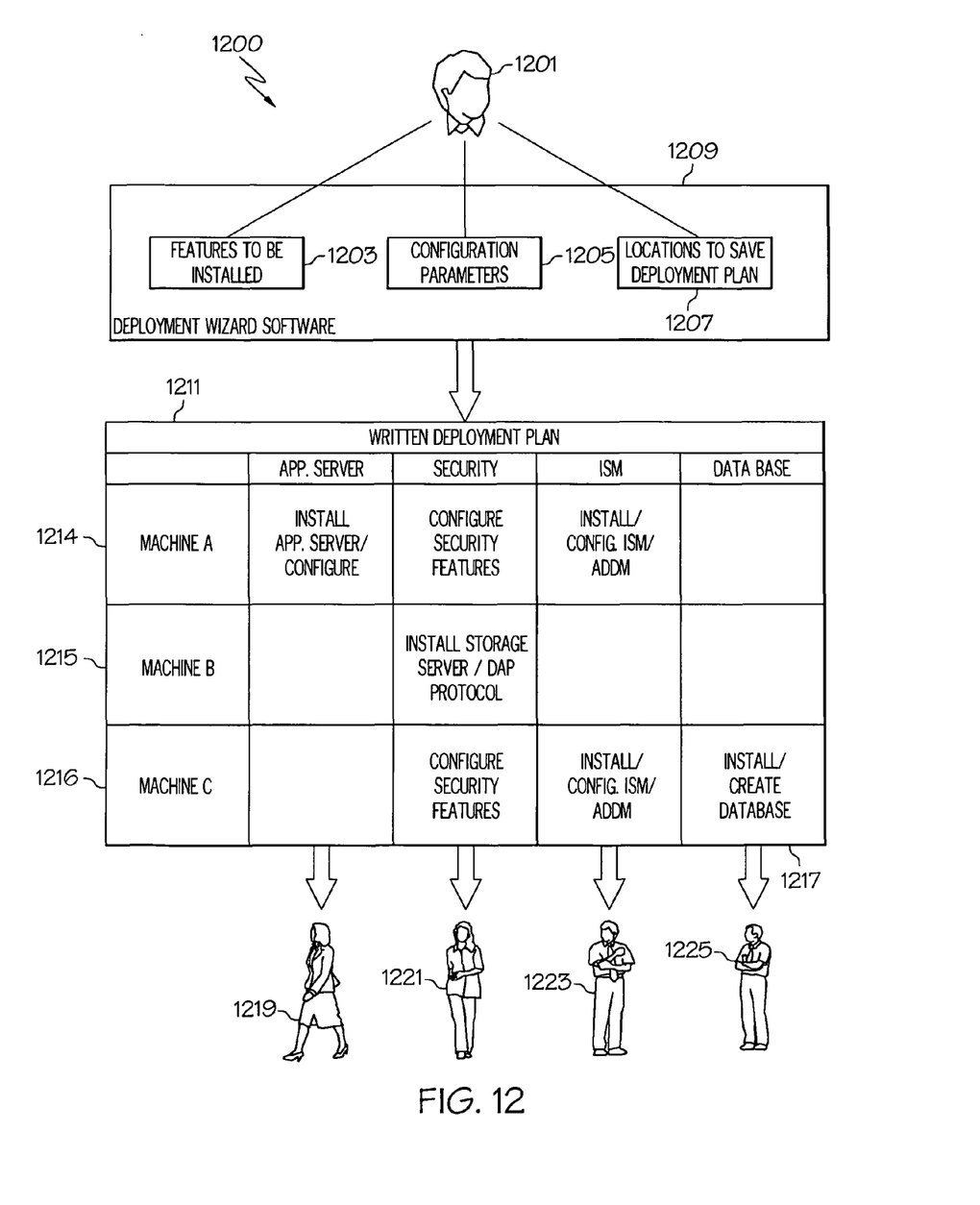
FIG. 12 is a diagram of an illustrative system for deploying software with tasks divided according to administrative roles, according to one embodiment of principles described herein.
Figure 13:
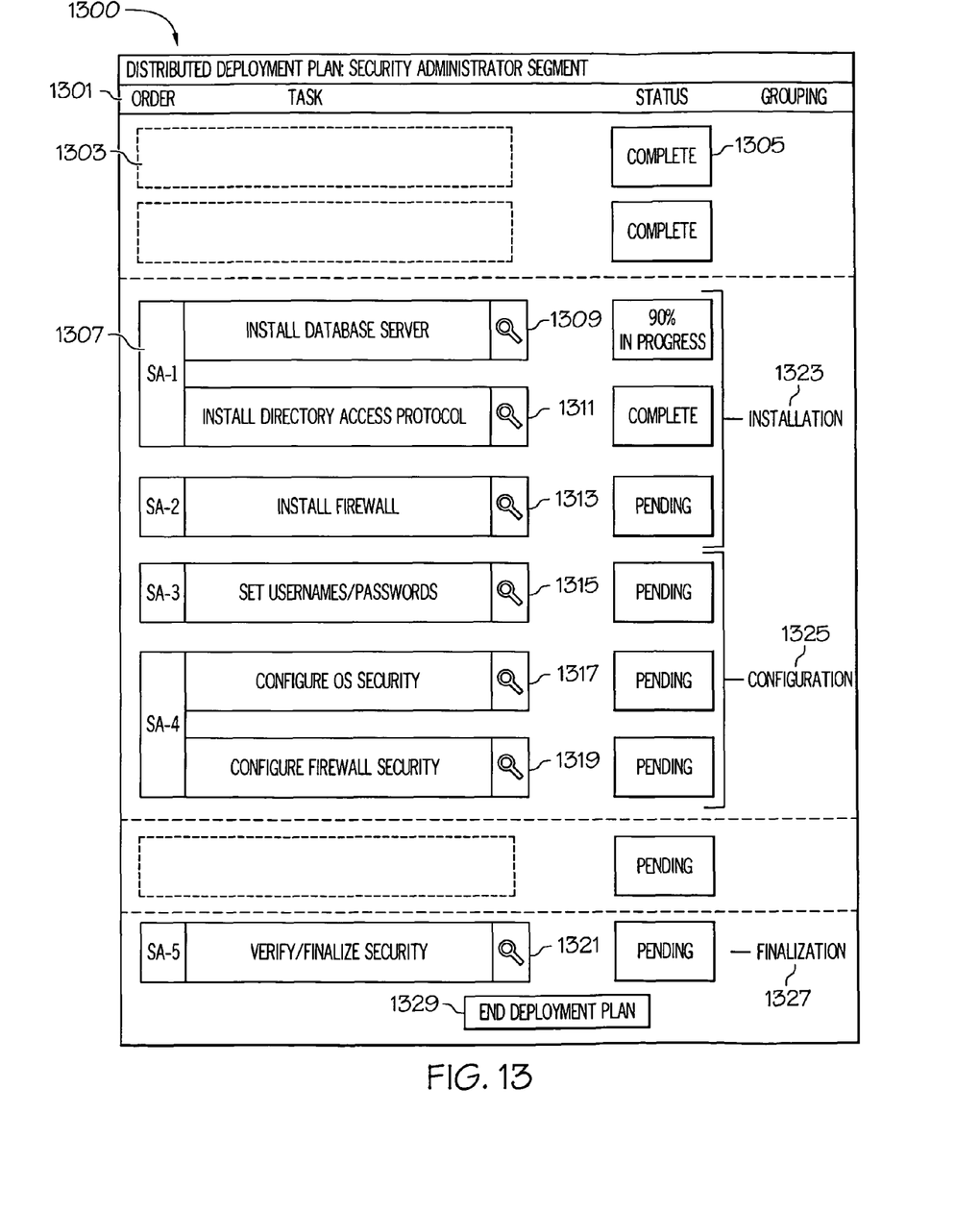
FIG. 13 is a diagram of an illustrative software deployment plan, according to one embodiment of principles described herein.

FIG. 12 and FIG. 13 are illustrative diagrams showing the deployment of software by a group of individuals within an organization such as subject matter experts or IT administrators. FIG. 12 shows an illustrative system (1200) containing an IT infrastructure that is made up of three machines: machine A (1214), machine B (1215) and machine C (1216). Each of these machines (1214, 1215, 1216) may support a number of applications and functions within the organization. The various applications and functions supported by the IT Infrastructure are administrated by various individuals (1219, 1221, 1223, 1225). By way of example and not limitation, a first individual (1219) may be an application server administrator, a second individual (1221) may be a security administrator, a third individual (1223) may be an information security management administrator, and a fourth individual (1225) may be a database administrator. Each of these individuals may have administrative responsibilities over a number of machines within the IT infrastructure. For example, the security administrator (1221) may have responsibilities to oversee the security of each machine within the IT infrastructure.

A user (1201) determines that it is desirable to deploy software onto the IT infrastructure. By way of example and not limitation, the software may be a patch to solve a software malfunction, an upgrade from an older version of a software package, or a new software application. After the necessary preparation, the user (1201) starts the deployment program software (1209). The deployment program software (1209) may be executed on a control machine within the organization's IT infrastructure or on another machine.

As illustrated in FIG. 4 through FIG. 11, the deployment program software (1209) may provide a graphical user interface to a user (1201). The deployment program software (1209) may prompt the user to enter various data relating to a deployment plan. The deployment program software (1209) may also access other resources, such as a configuration and change management database, to ascertain information related to the deployment of the selected software. By way of example and not limitation, the user (1201) may be prompted to enter the features to be installed (1203), the configuration parameters (1205), and locations to save the deployment plan (1207).

By way of example and not limitation, the deployment program software (1209) may be configured to prompt the user (1201) to select certain features (1203) of the software to be included and/or omitted in the deployment of the software to the target computing devices (1214, 1215, 1216). For example, the software features may include application server software, data storage server software, database server software, and systems management software. In such cases, the user (1201) may be prompted by the deployment program software (1209) to declare which of these features to deploy to the target computing devices.

The deployment program software (1209) may also be configured to prompt the user (1201) for configuration parameters (1205) corresponding to a desired configuration on each target computing device (1214, 1215, 1216) of the software being deployed. Additionally or alternatively, the deployment program software (1209) may be configured to prompt the user (1201) for a location to save the deployment plan (1211) that will be created by the deployment program software (1209) using both the input from the user (1201) and standard installation procedure corresponding to the software to be installed.

The software program (1209) creates a deployment plan (1211) which includes various granular sub-tasks (1217). As previously described, the deployment plan (1211) may be saved to disk and retrieved, modified, distributed, or executed at a later time. According to one exemplary embodiment, the deployment plan (1211) may be created and saved in a standardized format that may be read and executed by a plurality of platforms. As mentioned previously, a variety of scripting languages such as Apache ANT may be used to automate the software build process. In certain embodiments, the deployment program software may be used to execute and/or modify the deployment plan (1211) for an individual machine. Additionally or alternatively, the deployment plan (1211) may be modified and executed using standard scripting editors or other software tools.

The deployment plan (1211) includes all of the necessary steps to install the software to the target computing devices (1214, 1215, 1216) and configure the software according to the input received from the user (1201). Once the deployment plan is created, the user (1201) may be given the option to execute the deployment plan (1211) and complete the deployment of the software to the target computing device (1214, 1215, 1216). According to one exemplary embodiment, the complete software deployment plan (1211) is an executable computer program that allows a single person to execute the entire plan from an orchestrating computing device.

To support production deployments where a number of individuals (1219, 1221, 1223, 1225) each execute the tasks that correspond to their IT roles, the tasks can be subdivided according to the machine upon which the task is to be performed and/or the role of the individual which will perform the task. By way of example and not limitation, a first task (1217) requires that the database administrator install/create a database on machine C (1216). Regardless of the number of machines in the IT infrastructure or number of individuals that administer the IT infrastructure, a single deployment plan is created. This deployment plan is divided into logical segments containing various sub-tasks. For example, the security administrator (1221) has been assigned a logical segment which includes sub-tasks performed on each of the three machines (1214, 1215, 1216). Dividing the sub-tasks that make up the deployment plan provides additional flexibility for the organization in deploying the software in the various scenarios.

According to one exemplary embodiment, these logical segments may be distributed to the individuals (1219, 1221, 1223, 1225) in a variety of ways. By way of example and not limitation, the sub-tasks may be made available to the individuals (1219, 1221, 1223, 1225) using any means that may suit a particular application of the principles herein, including, but not limited to, access to a shared folder over a network, electronic delivery (e.g. email), transfer of physical media, and the like. The information sent to the individuals (1219, 1221, 1223, 1225) may contain a variety of information including, but not limited to, the identity of the target machine(s), the sub-task to be performed, various scripts or ANT implementations for automation of the task, the order in which the tasks are to be performed and other like information. The individuals (1219, 1221, 1223, 1225) may work directly on the sub-task files or utilize a user program to implement the various segments of the deployment plan.

FIG. 13 is a diagram showing an illustrative graphical user program (1300) configured to assist various individuals as they execute their assigned segments of a software deployment plan. According to one exemplary embodiment, the graphical user program (1300) displays a series of tasks (1309 through 1321) in the sequential order that they should be performed to execute the deployment plan. A header (1301) lists the various elements in each entry. The header (1301) may include an order column, a task column, a status column, and a grouping column. The order column describes the sequence in which the sub-tasks (1030, 1307) should be performed. According to one embodiment, the order column contains a step identifier associated with each sub-task. In some cases, the sequence in which two or more steps are performed may not be important. For example, a first step identifier (1307) spans two sub-tasks (1309, 1311) indicating that there is no preferred order in accomplishing those particular sub-tasks.

The task column includes a description of the sub-tasks to be performed. In some circumstances it may be desirable to include an indication of preceding sub-tasks (1303) assigned to another co-worker or subject matter specialist to give context and assist in scheduling. In one embodiment, a magnifying glass icon allows the administrator to examine and modify the underlying implementation details of each sub-task. The individuals may be allowed to modify various implementation details of a sub-task to best fit the individual configurations of the computing devices and systems for which they have responsibility. For example, the administrators may review the sub-tasks and create additional sub-tasks in the deployment plan and/or remove certain tasks from the deployment plan. In certain embodiments, alterations to key portions of the plan may be prevented to preserve the integrity of the overall deployment plan.

The status column may include one or more status blocks (1305) that indicate the status of the sub-task. By way of example, the status block may indicate that a sub-task is complete, pending, in progress, failed, or other information. The grouping column could show a variety of information about commonalties between the sub-tasks listed. By way of example and not limitation, a portion of the tasks could fall within an installation group (1323) or a configuration group (1325).

In the example shown in FIG. 13, the graphical user interface (1300) illustrates a logical segment of a software deployment plan assigned to a security administrator. Various tasks (1303) must be completed before the security administrator can begin her sub-tasks (1309 through 1319). After the security administrator has completed sub-task (1319), she must wait for another administrator to complete an intervening segment before completing the "verify/finalize security" sub-task (1321). A notice (1329) at the bottom of the interface indicates that after all of the above tasks are complete, the software deployment plan has been successfully concluded.

Additional functionality may be present that is not illustrated in FIG. 13. By way of example and not limitation, the software deployment plan and supporting interfaces (if any) may provide the ability to run only a subset of the tasks present in the deployment plan. The software deployment plan may also include the ability to uninstall a subset of the tasks and/or stop the execution of a task before it is complete. In some embodiments, all log files generated during the execution of the deployment plan may be saved in a central repository to aid in debugging.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for multi-scenario software deployment, comprising:
   creating a persistent software deployment plan by:

granulating tasks in said persistent software deployment plan into sub-tasks that do not cross organizational roles, in which each sub-task is an independently executable computer program that is both machine-readable and human-readable, said sub-tasks being configured to be performed independently, wherein granulating tasks comprises separating installation operations and configuration operations into different sub-tasks, such that no sub-task includes both an installation and configuration operation;

grouping said sub-tasks by corresponding Information Technology (IT) organizational roles;

defining a sequence for executing said sub-tasks, wherein said persistent software deployment plan contains ordering dependency information that describes a plurality of allowable sequences for executing sub-tasks contained within said persistent software deployment plan;

displaying said sequence for executing said sub-tasks in human readable format; and optimizing said sequence according to a specific deployment scenario;

saving said persistent software deployment plan on a computer readable medium; and distributing each group of sub-tasks to an IT administrator having an IT organizational role corresponding to that group of sub-tasks.

2. The method of claim 1, further comprising executing said sub-tasks according to said persistent software deployment plan.

3. The method of claim 2, wherein said executing said persistent software deployment plan is configured to allow stopping, undoing of, and re-execution of said sub-tasks.

4. The method of claim 1, further comprising:
executing said sub-tasks in an order specified by said sequence.

5. The method of claim 1, further comprising grouping said sub-tasks into logical segments according to different machines for which each sub-task is to be performed, such that each logical segment corresponds to a specific IT organizational role and a specific machine.

6. The method of claim 1, retrieving said persistent software deployment plan from a saved location and executing said persistent software deployment plan with no additional user input.

7. The method of claim 1, further comprising accepting modifications to said software deployment plan by personnel with responsibility for fulfilling said IT organizational roles.

8. The method of claim 1, wherein said persistent software deployment plan for multiple computing devices is executable and modifiable by a single person from an orchestrating device.

9. The method of claim 1, further comprising using a deployment program to inventory a target computer system and evaluate conditions for including tasks within said persistent software deployment plan.

10. The method of claim 9, wherein said using said deployment program to inventory a target computer system comprises interrogating said target computer system for existing instances of software and leveraging any said existing instances of software to eliminate unneeded corresponding sub-tasks.

11. The method of claim 1, further comprising consolidating duplicate tasks and subtasks.

12. The method of claim 1, wherein said persistent software deployment plan is configured to be retrieved from said computer readable medium and executed at a later date.

13. The method of claim 1, further comprising reporting an execution status of said sub-tasks to a user.

14. The method of claim 1, further comprising displaying a user interface, the user interface displaying each sub-task, a logical segment in which each sub-task belongs, a sequence for executing said logical segments, and current progress in executing said logical segments.

15. The method of claim 1, further comprising describing, in said persistent software deployment plan, a plurality of allowable sequences for executing tasks in said persistent software deployment plan.

16. A system, comprising:
at least one target computing system; and
a software deployment program; wherein said software deployment program is configured to:
query a user for deployment parameters corresponding to software to be deployed on said at least one target computing system;
interrogate said at least one target computing system for existing instances of software;
determine tasks to be performed to configure software according to said deployment parameters, said tasks being independently executable;
divide said tasks into logical segments and sub-tasks, said logical segments corresponding to separate IT administration roles;
wherein dividing tasks comprises separating installation operations and configuration operations into different sub-tasks, such that no sub-task includes both an installation and configuration operation;
defining a sequence for executing said sub-tasks, wherein said persistent software deployment plan contains ordering dependency information that describes a plurality of allowable sequences for executing sub-tasks contained within said persistent software deployment plan;
generate a human-readable and human-modifiable software deployment plan, said software deployment plan comprising a sequenced set of said logical segments;
displaying said sequence for executing said sub-tasks in human readable format;
optimizing said sequence according to a specific deployment scenario; and
executing at least a portion of said software deployment plan on said at least one target computing system.

17. The system of claim 16, in which said software deployment plan is saved in a file folder with sub folders, each sub folder containing a logical segment of said software deployment plan such that an IT administrator can access and independently execute logical segments that are associated with an organizational role of said IT administrator.

18. The system of claim 16, further comprising a user interface configured to display each sub-task, a logical segment in which each sub-task belongs, a sequence for executing said logical segments, and current progress in executing said logical segments.

19. A computer program product for multi-scenario software deployment comprising:
a computer usable memory having computer usable program code embodied therewith, the computer usable program code comprising:
computer usable program code configured as a software deployment program; said software deployment program running on a controlling computing device;
wherein said software deployment program is configured to:

query a user for deployment parameters corresponding to software to be deployed on at least one target computing device;

create a persistent software deployment plan for said at least one target computing device; wherein said persistent software deployment plan is saved and retrieved at a later time for execution, said persistent software deployment plan comprising a plurality of tasks that are independently executable by separate IT administrators, each of said tasks comprising an independently executable computer program that is both machine-readable and human-readable, said tasks being configured to deploy said software to said at least one target computing device according to said deployment parameters;

dividing said tasks into logical segments and sub-tasks, said logical segments corresponding to separate IT administration roles;

wherein dividing tasks comprises separating installation operations and configuration operations into different sub-tasks, such that no sub-task includes both an installation and configuration operation;

defining a sequence for executing said tasks, wherein said persistent software deployment plan contains ordering dependency information that describes a plurality of allowable sequences for executing tasks contained within said persistent software deployment plan;

displaying said sequence for executing said tasks in human readable format;

optimizing said sequence according to a specific deployment scenario; and retrieve said persistent software deployment plan from a saved location and execute said persistent software deployment plan with no additional user input.

20. A method for multi-scenario software deployment, comprising:

creating a persistent software deployment plan for deployment of software in a system with multiple computing devices by:
  granulating tasks in said persistent software deployment plan into sub-tasks that do not cross organizational roles, in which each sub-task is an independently executable computer program to deploy software, in which each sub-task is both machine-readable and human-readable, wherein granulating tasks comprises separating installation operations and configuration operations into different sub-tasks, such that no sub-task includes both an installation and configuration operation;
  grouping said sub-tasks by corresponding Information Technology (IT) organizational roles and according to different machines for which each sub-task is to be performed;
  distributing each group of sub-tasks to an IT administrator having an IT organizational role corresponding to that group of sub-tasks;
  defining a sequence for executing said sub-tasks, wherein said persistent software deployment plan contains ordering dependency information that describes a plurality of allowable sequences for executing sub-tasks contained within said persistent software deployment plan;
  displaying said sequence for executing said sub-tasks in human readable format; and
  optimizing said sequence according to a specific deployment scenario;

saving said persistent software deployment plan on a computer readable storage medium;

retrieving said persistent software deployment plan from said computer readable storage medium; and executing, on an orchestrating computing device and with no additional user input, said sub-tasks in an order specified by said sequence.

* * * * *